US011228191B2

(12) United States Patent
Kelley (10) Patent No.: US 11,228,191 B2
(45) Date of Patent: Jan. 18, 2022

(54) SENSOR DEVICES POWERED BY INHERENT MOTION OF EXTERNAL DEVICES

(71) Applicant: Chevron U.S.A. Inc., San Ramon, CA (US)

(72) Inventor: Nathan Michael Kelley, Midland, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 84 days.

(21) Appl. No.: 16/710,411

(22) Filed: Dec. 11, 2019

(65) Prior Publication Data
US 2021/0184482 A1 Jun. 17, 2021

(51) Int. Cl.
*H02J 7/00* (2006.01)
*G05B 15/02* (2006.01)
*H04Q 9/00* (2006.01)

(52) U.S. Cl.
CPC .......... *H02J 7/0068* (2013.01); *G05B 15/02* (2013.01); *H04Q 9/00* (2013.01); *H04Q 2209/40* (2013.01); *H04Q 2209/88* (2013.01)

(58) Field of Classification Search
CPC ......... H02J 7/0068; G05B 15/02; H04Q 9/00; H04Q 2209/40; H04Q 2209/88
See application file for complete search history.

(56) References Cited

U.S. PATENT DOCUMENTS

| | | | |
|---|---|---|---|
| 2013/0200883 A1* | 8/2013 | Mehnert | G01R 33/072 324/207.2 |
| 2014/0047911 A1* | 2/2014 | Repetto | G01M 15/14 73/112.05 |
| 2016/0050469 A1* | 2/2016 | Subiry | H04Q 9/00 340/870.17 |
| 2016/0061637 A1* | 3/2016 | Aichriedler | G01D 11/24 324/207.12 |
| 2017/0052038 A1* | 2/2017 | Aichriedler | G01D 5/145 |
| 2017/0089724 A1* | 3/2017 | Mehnert | G01D 5/145 |
| 2017/0306745 A1* | 10/2017 | Harding | F04B 17/03 |
| 2018/0364066 A1* | 12/2018 | Satz | G01D 5/147 |
| 2021/0131586 A1* | 5/2021 | Larsen | F16K 31/047 |

OTHER PUBLICATIONS

"Motion-powered phone charger sashays in" downloaded Dec. 11, 2019 at https://www.cnet.com/news/motion-powered-phone-charaer-sashays-in, dated Aug. 24, 2008.

* cited by examiner

*Primary Examiner* — Amine Benlagsir
(74) *Attorney, Agent, or Firm* — King & Spalding LLP (57) ABSTRACT

A sensor device can include an energy storage device that provides power when charged. The sensor device can also include a first sensor coupled to the energy storage device, where the first sensor measures at least one first parameter when receiving the power. The sensor device can further include a wire having a first portion and a second portion, where the first portion of the wire is coupled to the energy storage device, where the second portion of the wire is disposed proximate to the at least one magnet, where relative motion between the second portion of the wire and the at least one magnet induces current in the wire, where the current induced in the second portion of the wire flows to the energy storage device through the first portion of the wire to charge the energy storage device.

16 Claims, 5 Drawing Sheets

SENSOR DEVICES POWERED BY INHERENT MOTION OF EXTERNAL DEVICES

TECHNICAL FIELD

Embodiments described herein relate generally to sensor devices, and more particularly to systems, methods, and devices for sensor devices powered by inherent motion of external devices.

BACKGROUND

Many applications exist where sensor devices are needed to provide measurement of one or more parameters, but the location is remote and not easily accessible to a wired power source. Batteries can be used, but they are of a limited life, rendering the sensor device useless after the battery runs out. Alternative supplements, such as a use-specific photovoltaic solar system, can be used, but these are not always reliable and can require periodic maintenance that is not often convenient.

SUMMARY

In general, in one aspect, the disclosure relates to a sensor device that can include an energy storage device that provides power when charged. The sensor device can also include a first sensor coupled to the energy storage device, where the first sensor measures at least one first parameter when receiving the power. The sensor device can further include a wire having a first portion and a second portion, where the first portion of the wire is coupled to the energy storage device, where the second portion of the wire is disposed proximate to at least one magnet, where relative motion between the second portion of the wire and the at least one magnet induces current in the wire, where the current induced in the second portion of the wire flows to the energy storage device through the first portion of the wire to charge the energy storage device.

In another aspect, the disclosure can generally relate to a system that includes an external device and a sensor device. The external device can include a movable portion while operating, where the movable portion includes at least one magnet. The sensor device can include an energy storage device that provides power when charged. The sensor device can also include a sensor coupled to the energy storage device, where the sensor measures at least one first parameter when receiving the power. The sensor device can further include a wire having a first portion and a second portion, where the first portion of the wire is coupled to the energy storage device, where the second portion of the wire is disposed proximate to the at least one magnet, where relative motion between the second portion of the wire and the at least one magnet induces current in the wire, where the current induced in the second portion of the wire flows to the energy storage device through the first portion of the wire to charge the energy storage device.

These and other aspects, objects, features, and embodiments will be apparent from the following description and the appended claims.

BRIEF DESCRIPTION OF THE DRAWINGS

The drawings illustrate only example embodiments of sensor devices powered by inherent motion of external devices and are therefore not to be considered limiting of its scope, as sensor devices powered by inherent motion of external devices may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, methods, and devices for sensor devices powered by inherent motion of external devices. Example embodiments can be used in any environment (e.g., indoor, outdoor, hazardous, non-hazardous, high humidity, low temperature, corrosive, sterile, high vibration).

In certain example embodiments, sensor devices are subject to meeting certain standards and/or requirements. For example, the National Electric Code (NEC), Underwriters Laboratory (UL), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., sensor devices), wiring, and electrical connections. Use of example embodiments described herein meet (and/or allow a corresponding device to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of sensor devices powered by inherent motion of external devices will be described more fully hereinafter with reference to the accompanying drawings, in which example embodiments of sensor devices powered by inherent motion of external devices are shown. Sensor devices powered by inherent motion of external devices may, however, be embodied in many different forms and should not be construed as limited to the example embodiments set forth herein. Rather, these example embodiments are provided so that this disclosure will be thorough and complete, and will fully convey the scope of sensor devices powered by inherent motion of external devices to those of ordinary skill in the art. Like, but not necessarily the same, elements (also sometimes called components) in the various figures are denoted by like reference numerals for consistency.

Terms such as "first", "second", "on", "upon", "outer", "inner", "top", "bottom", and "within" are used merely to distinguish one component (or part of a component or state of a component) from another. Such terms are not meant to denote a preference or a particular orientation. Such terms are not meant to limit embodiments of sensor devices powered by inherent motion of external devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
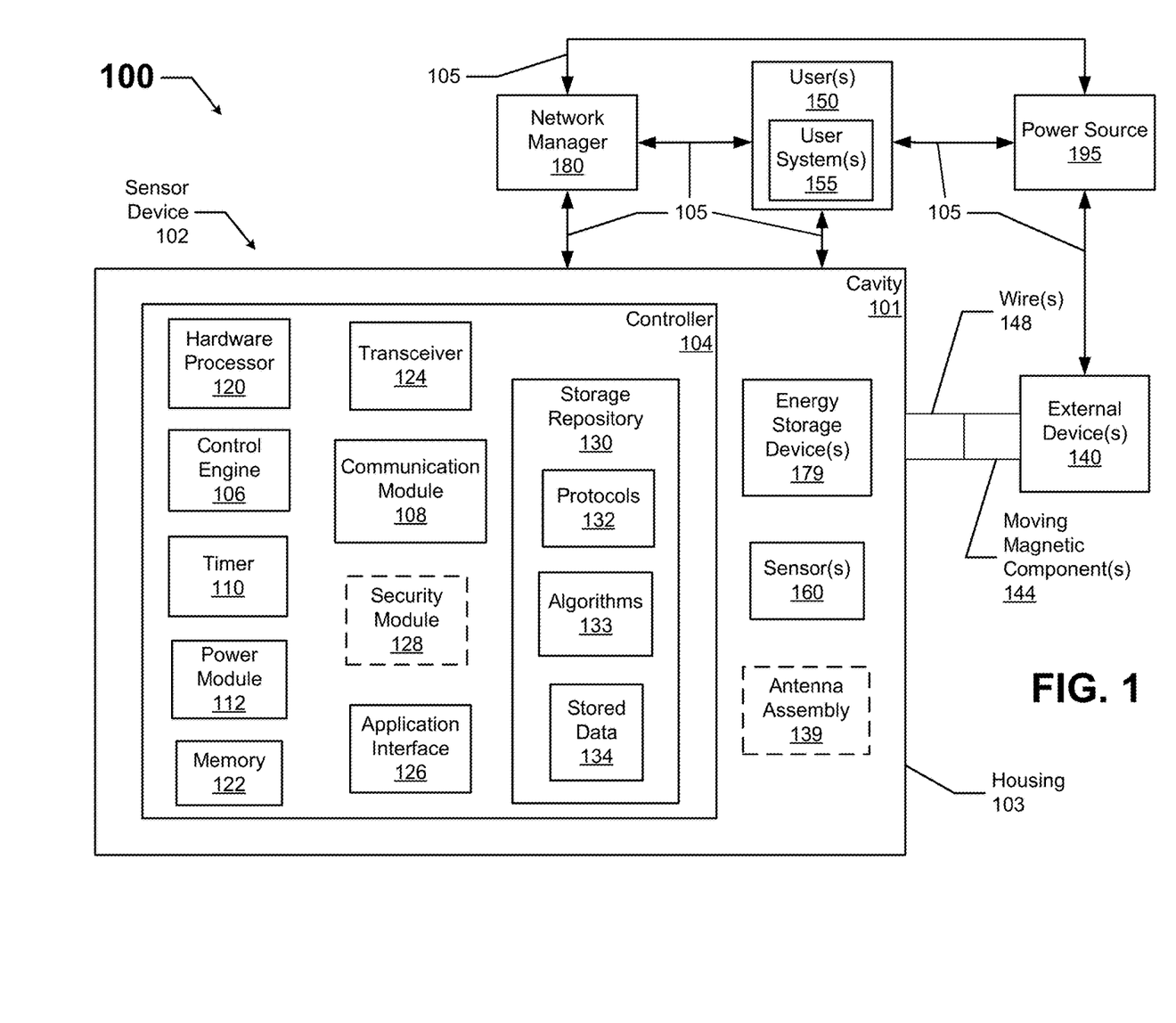
FIG. 1 shows a diagram of a system that includes a sensor device in accordance with certain example embodiments.

FIG. 1 shows a system diagram of a system 100 that includes sensor device 102 in accordance with certain example embodiments. The system 100 can include a power source 195, one or more users 150, a network manager 180, one or more external devices 140, and the sensor device 102. The sensor device 102 can include a controller 104, one or more energy storage devices 179, one or more optional antenna assemblies 139 (also sometimes more simply called an antenna 139 herein), and one or more sensors 160. The sensor device 102 can also include one or more wires 148 that interact with one or more moving magnetic components 144 of the one or more external devices 140.

The controller 104 can include one or more of a number of components. As shown in FIG. 1, such components can include, but are not limited to, a control engine 106, a communication module 108, a timer 110, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example sensor device. Any component of the example sensor device 102 can be discrete or combined with one or more other components of the sensor device 102. For example, rather than being part of the sensor device 102, the controller 104 (or portions thereof) can be part of a controller of an external device 140.

A user 150 can be any person that interacts with the sensor device 102 or components thereof (e.g., an antenna assembly 139, a sensor 160). Examples of a user 150 may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative. The user 150 can include and use a user system 155, which may include a display (e.g., a GUI) and a type of interface (e.g., a touchscreen, a keyboard, a mouse). Examples of a user system 155 (also sometimes called a user device 155 herein) can include, but are not limited to, a smart phone, an electronic pad, a laptop computer, a desktop computer, and a dedicated electronic device. A user 150 (including an associated user system 155) interacts with (e.g., sends data to, receives data from) the controller 104 of the sensor device 102 via the application interface 126 (described below). A user 150 (including an associated user system 155) can also interact with a network manager 180 and/or the power source 195.

Interaction between a user 150 (including an associated user system 155) and the sensor device 102, the network manager 180, and the power source 195 can be conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100, LoRa) technology. For example, a communication link 105 can be (or include) one or more electrical conductors that are coupled to the power source 195 and an external device 140 to provide power and/or control to the external device 140. As another example, a communication link 105 can be (or include) a Wi-Fi connection between the sensor device 102 and the network manager 180. The communication link 105 can transmit signals (e.g., power signals, communication signals, control signals, data) between the sensor device 102 and a user 150 (including an associated user system 155), the network manager 180, and/or the power source 195.

The network manager 180 is a device or component that controls all or a portion of the system 100 that includes the controller 104 of the sensor device 102, additional sensor devices, and the power source 195 (and so also, directly or indirectly, the external devices 140). The network manager 180 can be substantially similar to (e.g., in terms of components, in terms of functionality) the controller 104 of the sensor device 102. Alternatively, the network manager 180 can include one or more of a number of components and/or functions in addition to, or altered from, the components and/or functions of the controller 104 described below.

In certain example embodiments, the network manager 180 can receive measurements of one or more parameters, taken by one or more of the sensors 160 of the sensor device 102. The network manager 180 can use these measurements in the execution of one or more algorithms 133 (e.g., models) over time to evaluate operating conditions, to evaluate the health of a remote device 140 or some other component of the system 100, and/or for making some other predictive determination relative to the system 100 or portion thereof. The network manager 180 can be, at least in part, a cloud-based construct. As described herein, communication with the network manager 180 can include communicating with one or more other components (e.g., a user system 155 of a user 150) of the system 100. In such a case, the network manager 180 can facilitate such communication. The network manager 180 can also be called any of a number of other names known in the art, including but not limited to a master controller, a system manager, a system controller, an enterprise controller, and a control manager.

The power source 195 of the system 100 provides AC mains or some other form of power to the one or more external devices 140, as well as to one or more other components (e.g., the network manager 180) and one or more user systems 155 of one or more users 150 of the system 100. The power source 195 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 195 can be, or include, for example, a wall outlet, an energy storage device (e.g. a battery, a supercapacitor), a circuit breaker, and/or an independent source of generation (e.g., a photovoltaic solar generation system). The power source 195 can also include one or more components (e.g., a switch, a relay, a controller) that allow the power source 195 to communicate with and/or follow instructions from a user 150 (including an associated user system 155) and/or the network manager 180.

Each external device 140 of the system 100 is or includes a component that inherently moves during its operation. Examples of an external device 140 can include, but are not limited to, a reciprocating pumping unit (also called a pump jack, used to extract subterranean resources in oil and gas operations), a piston, a centrifugal (mechanical) pump, a centrifugal (mechanical) compressor, and a bearing. Further, an external device 140 can have one or more moving magnetic components 144. Each moving magnetic component 144 of an external device 140 has magnetic properties that allow the moving magnetic component 144 to generate a magnetic field. A moving magnetic component 144 can be a portion of the external device 140 that is made of a magnetic material. In addition, or in the alternative, a moving magnetic component 144 can be one or more magnets that are attached to (e.g., adhered to, fastened to, screwed into) an external device 140.

Each moving magnetic component 144 can have any of a number of characteristics (e.g., shape, size, magnetic strength, magnetic polarity, composition of material). The range of motion and path of travel of a moving magnetic component 144 can be consistent while the external device 140 is operating. For example, a moving magnetic component 144 can travel back and forth along a linear path spanning one foot while the external device 140 is operating. As another example, a moving magnetic component 144 can travel in a circle that is six inches in diameter while the external device 140 is operating. As yet another example, a moving magnetic component 144 can rotate around a point at its approximate center while the external device 140 is operating.

The rate of movement of a moving magnetic component 144 can vary based on the speed at which the external device 140 operates. If the external device 140 has a single speed of operation, then the rate of movement of a moving magnetic component 144 is constant while the external device 140 is operating. Alternatively, if the external device 140 is capable of operating at variable speeds, then the rate of movement of a moving magnetic component 144 can change over time as the external device 140 is operating. These moving magnetic components 144 can be accessible to allow for one or more of the wires 148 to be placed in proximity to the moving magnetic component 144 when the moving magnetic component 144 is in motion.

Each of the wires 148 is made of one or more of a number of electrically-conductive materials (e.g., copper, aluminum). In addition to the material, a wire 148 can have one or more of any of a number of other characteristics (e.g., thickness, length, cross-sectional shape, number of times wound around some or all of a moving magnetic component 144). At least part of each of the wires 148 is electrically coupled, directly or indirectly, to the energy storage device 179. At least another part of each of the wires 148 is placed in proximity to the moving magnetic component 144. For example, a portion of the wire 148 can be wrapped around the moving magnetic component 144 at all times throughout the range of motion of the moving magnetic component 144. As another example, a portion of the wire 148 can be disposed next to the moving magnetic component 144 at all times throughout the range of motion of the moving magnetic component 144. As yet another example, a portion of the wire 148 can be disposed next to the moving magnetic component 144 at one end of the range of motion of the moving magnetic component 144.

Figure 4:
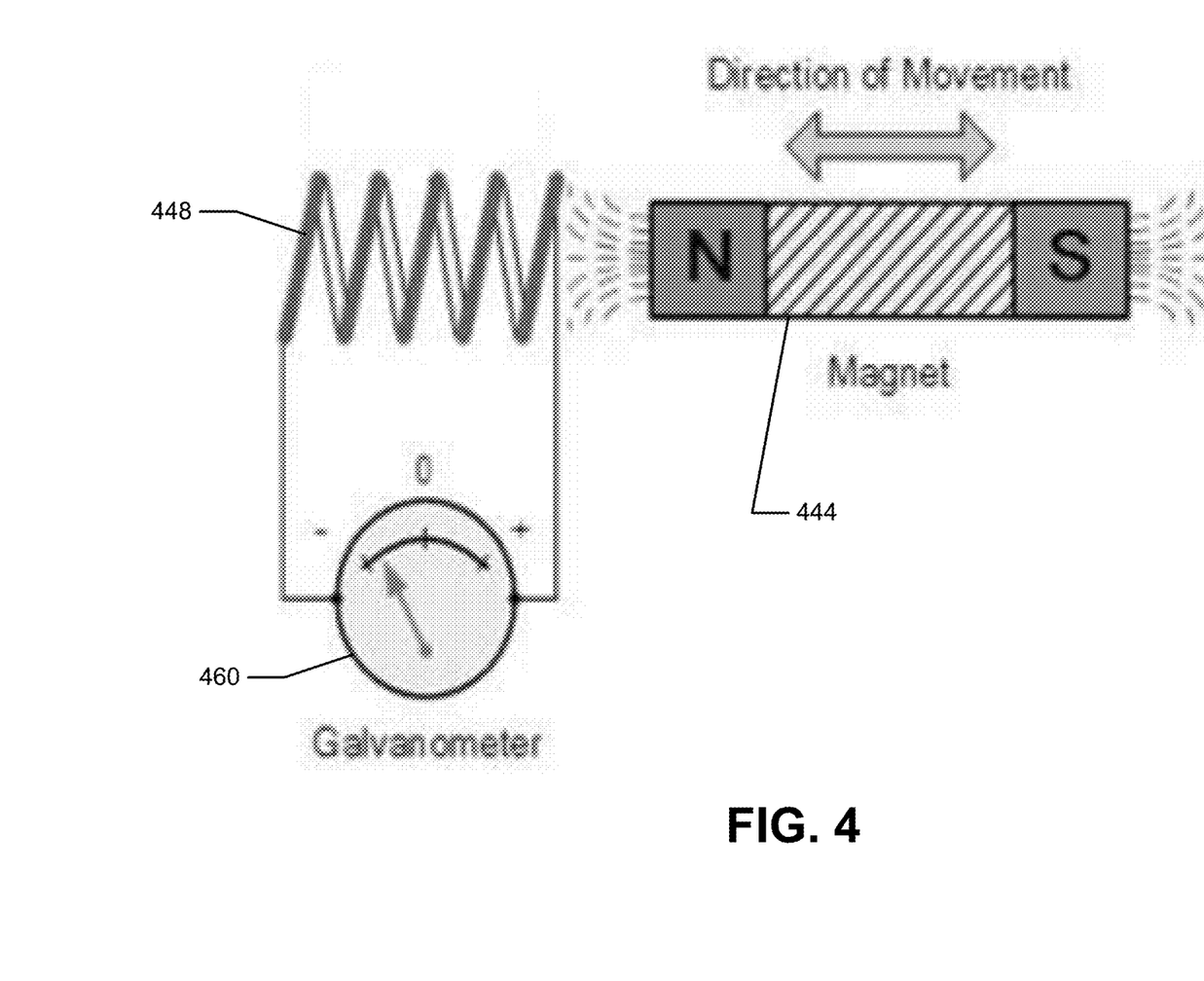
FIG. 4 shows an example of how Faraday's Law of Electromagnetic Induction works.

The interaction between the one or more moving magnetic components 144 of an external device 140 and the wire 148 is based on Faraday's Laws of Electromagnetic Induction, which predicts how a magnetic field interacts with an electric circuit to generate an electromotive force (emf). Whenever there is relative motion between the wire 148 and the magnetic field created by moving magnetic component 144, the flux linkage with the wire 148 changes, and this change in flux induces a voltage across the wire 148. FIG. 4 below shows how Faraday's Laws of Electromagnetic Induction works.

Figure 3:
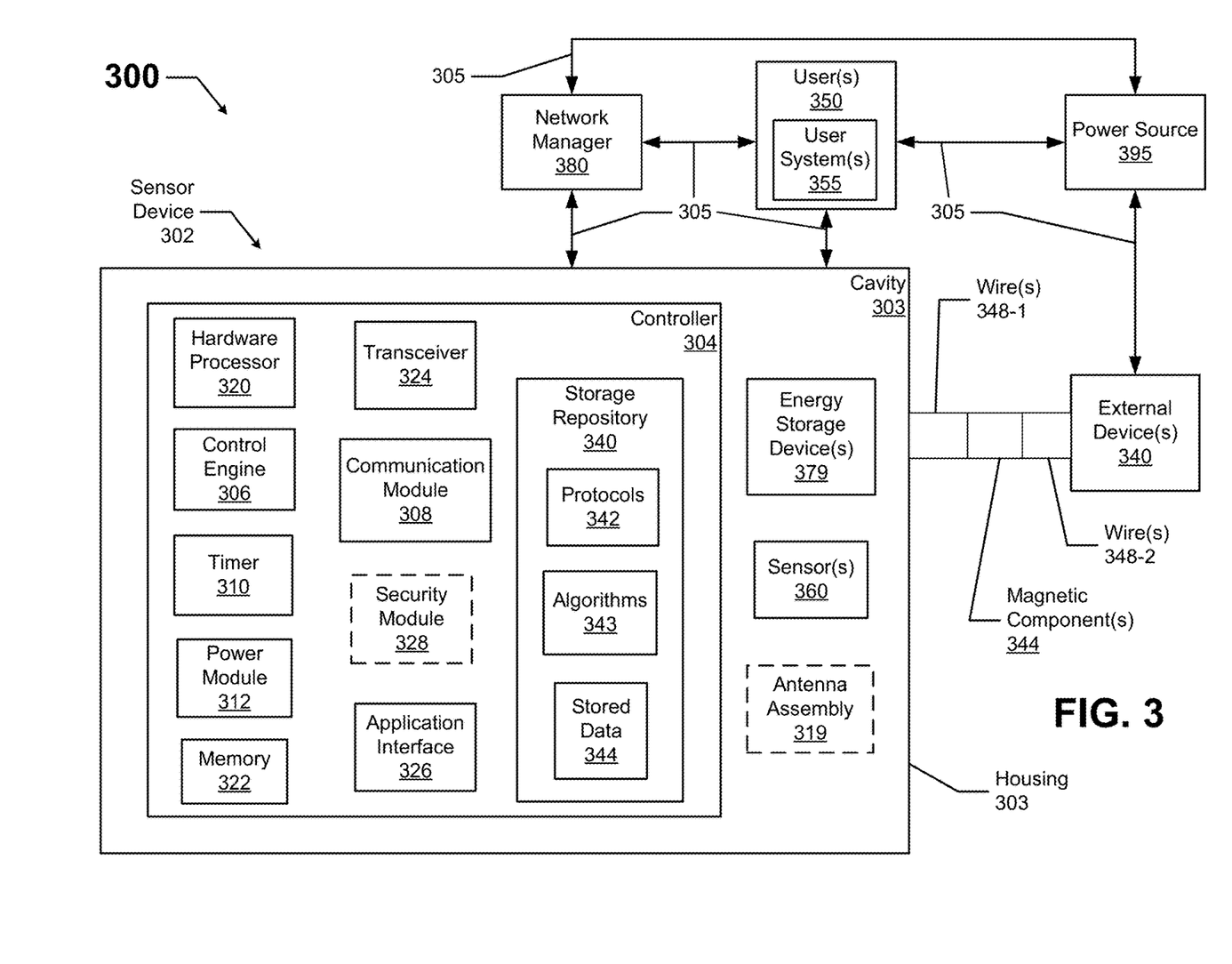
FIG. 3 shows a diagram of another system that includes a sensor device in accordance with certain example embodiments.

Since the generation of induced current used to provide power to the one or more energy storage devices 179 of the sensor device 102 is based on relative motion between the wire 148 and a magnetic field, in alternative embodiments, as shown in FIG. 3 below, the magnet can be stationary while the wire moves based on the movement of the external device 140.

An energy storage device 179 of the sensor device 102 can be any of a number of rechargeable batteries or similar storage devices that are configured to charge using some source of power. In this particular case, the energy storage device 179 is charged using current induced in one or more of the wires 148 by one or more moving magnetic components 144 attached to or embedded in one or more of the external devices 140. The energy storage device 179 can use one or more of any type of storage technology, including but not limited to a battery, a flywheel, an ultracapacitor, and a supercapacitor. If the energy storage device 179 includes a battery, the battery technology can vary, including but not limited to lithium ion, nickel-cadmium, lead/acid, solid state, graphite anode, titanium dioxide, nickel cadmium, nickel metal hydride, nickel iron, alkaline, and lithium polymer.

In some cases, one or more of the energy storage devices 179 charge using a different level and/or type of power relative to the level and type of induced power received through the wires 148. In such a case, the energy storage device 179 can include functionality to convert, invert, transform, and/or otherwise manipulate the induced power to the level and type of power used to charge some or all of the energy storage devices 179. Similarly, the stored power released by the one or more of the energy storage devices 179 can be of a different level and/or type of power relative to the level and type of power used by some or all of the other components of the sensor device 102. In such a case, the energy storage device 179 can include functionality to convert, invert, transform, and/or otherwise manipulate the stored power to the level and type of power used by some or all of the other components of the sensor device 102. Alternatively, such functionality can be included in the power module 112. A sensor device 102 can be any number of energy storage devices 179.

The optional antenna assembly 139 can be any assembly of components that is used to improve the ability of the sensor device 102 (or portion thereof, such as the transceiver 124 or a sensor 160) to send and/or receive signals with the network manager 180, the power source 195, a user 150 (including an associated user system 155), another sensor device, and/or some other device within the system 100. The antenna assembly 139 can be used to convert electrical power into radio waves and/or convert radio waves into electrical power. An antenna assembly 139 can be used with a single component (e.g., only a sensor 160) of the sensor device 102. Alternatively, an antenna assembly 139 can be used with multiple components (e.g., a sensor 160, the controller 104) of the sensor device 102.

In certain example embodiments, the antenna assembly 139 includes one or more of a number of components. Such components can include, but are not limited to, a receiver, a transmitter, a balun, a block upconverter, a cable (e.g., a coaxial cable or other form of communication link 105), a counterpoise (a type of ground system), a feed, a passive radiator, a feed line, a rotator, a tuner, a low-noise block downconverter, and a twin lead. Portions of the antenna assembly 139 can be in direct communication with, or can be shared with, one or more components (e.g., the communications module 108) of the controller 104 and/or a sensor 160. For example, the transceiver 124 of the controller 104 and/or a sensor 160 can be in direct communication with the antenna assembly 139.

The one or more example sensors 160 can include any type of sensing device that measure one or more parameters. Examples of types of a sensor 160 can include, but are not limited to, a tachometer, an accelerometer, a passive infrared sensor, a photocell, a pressure sensor, an air flow monitor, a gas detector, and a resistance temperature detector. A parameter that can be measured by a sensor 160 can include, but is not limited to, rotations, motion, an amount of ambient light, temperature, humidity, air quality, vibration, pressure, air flow, smoke (as from a fire), and detection of a gas.

A parameter (e.g., vibration, rpm, voltage) measured by a sensor 160 can be associated with the external device 140. Alternatively, a parameter measured by a sensor 160 can be unrelated to the external device 140. In such a case, the parameter can be associated with the environment (e.g., temperature, humidity) or with some other piece of equipment in the system 100. In the latter instance, the movement of an external device 140 can be used to provide power to a remotely-located (relative to the external device 140) sensor 160 of a sensor device 102.

In some cases, the parameter or parameters measured by a sensor 160 can be used in conjunction with one or more other components of the sensor device 102. For example, if a sensor 160 measures a number of rotations, the timer 110 can be used to determine how many rotations occur in a particular unit of time. Each sensor 160 can use one or more of a number of communication protocols (part of the protocols 132 of the storage repository). A sensor 160 can be associated with the sensor device 102. A sensor 160 can be located within the housing 103 of the sensor device 102, disposed on the housing 103 of the sensor device 102, or located outside the housing 103 of the sensor device 102.

In certain example embodiments, a sensor 160 can include an energy storage device (e.g., a battery) that is used to provide power, at least in part, to some or all of the sensor 160. In such a case, the energy storage device can be the same as, or independent of, the energy storage device 179, described above, of the sensor device 102. This additional energy storage device of the sensor 160 can operate at all times or only when the power provided by the energy storage device 179 is interrupted. Further, a sensor 160 can utilize or include one or more components (e.g., memory 122, storage repository 130, transceiver 124) found in the controller 104. In such a case, the controller 104 can provide the functionality of these components used by the sensor 160. Alternatively, the sensor 160 can include, either on its own or in shared responsibility with the controller 104, one or more of the components of the controller 104. In such a case, the sensor 160 can correspond to a computer system as described below with regard to FIG. 2.

The users 150 (including associated user systems 155), the network manager 180, the power source 195, and/or the sensors 160 can interact with the controller 104 of the sensor device 102 using the application interface 126 in accordance with one or more example embodiments. Specifically, the application interface 126 of the controller 104 receives data (e.g., information, communications, instructions, updates to firmware) from and sends data (e.g., information, communications, instructions) to the users 150 (including associated user systems 155), the network manager 180, the power source 195, and/or each sensor 160. The users 150 (including associated user systems 155), the network manager 180, the power source 195, and/or each sensor 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user systems 155 of the users 150, the network manager 180, and/or the power source 195 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The sensor device 102 can include a housing 103. The housing 103 can include at least one wall that forms a cavity 101. In some cases, the housing 103 can be designed to comply with any applicable standards so that the sensor device 102 can be located in a particular environment (e.g., outdoors, in an indoor "clean room", in a hazardous environment). The housing 103 of the sensor device 102 can be used to house one or more components of the sensor device 102, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), one or more of the sensors 160, one or more optional antenna assemblies 139, and the energy storage devices 179 are disposed in the cavity 101 formed by the housing 103.

In alternative embodiments, any one or more of these or other components of the sensor device 102 can be disposed on the housing 103 and/or remotely from the housing 103. For instance, an example sensor 160 (or portion thereof) can be integrated with the housing 103. As another example, some portion of the wire 148 can be located outside the housing 103, and some other portion of the wire 148 can be located inside the housing 103.

The storage repository 130 can be a persistent storage device (or set of devices) that stores software and data used to assist the controller 104 in communicating with the users 150 (including associated user systems 155), the network manager 180, and the power source 195 within the system 100. In one or more example embodiments, the storage repository 130 stores one or more protocols 132, one or more algorithms 133, and stored data 134. The communication protocols 132 can be any of a number of protocols that are used to send and/or receive data between the controller 104 and the users 150 (including associated user systems 155), the network manager 180, and the power source 195.

The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and a user 150 (including an associated user system 155), the network manager 180, and the power source 195. One or more of the protocols 132 used for communication can be a time-synchronized protocol. Examples of such time-synchronized protocols can include, but are not limited to, a highway addressable remote transducer (HART) protocol, a wirelessHART protocol, LoRa WAN protocol, and an International Society of Automation (ISA) 100 protocol. In this way, one or more of the protocols 132 used for communication can provide a layer of security to the data transferred within the system 100. Other protocols 132 can be associated with the use of Wi-Fi, Zigbee, visible light communication, cellular networking, Bluetooth Low Energy (BLE), Bluetooth, and any other communication protocols and/or technologies.

The algorithms 133 can be any procedures (e.g., a series of method steps), formulas, logic steps, mathematical models, forecasts, simulations, and/or other similar operational procedures that the control engine 106 of the controller 104 follows based on certain conditions at a point in time. An example of an algorithm 133 is measuring (using one or more of the sensors 160) one or more parameters, processing (using the control engine 106) the measurements, evaluating (using the control engine 106) the processed measurements, and storing (using the stored data 134 in the storage repository 130) the results.

One or more protocols 132 and/or algorithms 133 can be focused on certain components of the sensor device 102. For example, one or more protocols 133 can facilitate communication between a sensor 160 and the control engine 106 of the controller 104. As a specific example, one or more protocols 133 can be used by the control engine 106 to instruct a sensor 160 to measure a parameter, for the sensor 160 to send the measurement to the control engine 106, for the control engine 106 to analyze the measurement, (stored as stored data 134) and for the control engine 106 to take an action (e.g., send, using the transceiver 124, the communication module 108, and the optional antenna assembly 139, the results, send an alarm) based on the result (stored as stored data 134) of the analysis.

Stored data 134 can be any data associated with the sensor device 102 (including other sensor devices and/or any components of the sensor device 102), any measurements taken by the sensors 160, threshold values, settings for the sensor 160, user preferences, results of previously run or calculated algorithms 132, and/or any other suitable data. Such data can be any type of data, including but not limited to historical data, current data, and future data (e.g., forecasts). The stored data 134 can be associated with some measurement of time derived, for example, from the timer 110.

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

In some cases, one or more protocols 132 and/or algorithms 133 can be used with respect to the storage repository 130. For example, measurements made by a sensor 160 can be stored as stored data 134 in the storage repository 130. At some point (e.g., the passage of a certain period of time, when the amount of stored data 134 reaches a threshold value, when the motion of the external device 140 used to charge the energy storage device 179 causes the storage level in the energy storage device 179 to exceed a threshold value), a protocol 132 triggers the control engine 106 to transfer the measurements to some other form of storage (e.g., cloud-based storage, a storage repository of the network manager 180).

The storage repository 130 can be operatively connected to the control engine 106. In one or more example embodiments, the control engine 106 includes functionality to communicate with the users 150 (including associated user systems 155), the network manager 180, the power source 195, and the sensors 160 in the system 100. More specifically, the control engine 106 sends information to and/or receives information from the storage repository 130 in order to communicate with the users 150 (including associated user systems 155), the network manager 180, the power source 195, and the sensor 160. As discussed below, the storage repository 130 can also be operatively connected to the communication module 108 in certain example embodiments.

In certain example embodiments, the control engine 106 of the controller 104 controls (using one or more protocols 132 and/or one or more algorithms 133) the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., a sensor 160, a user 150 (including an associated user system 155)) in the system 100.

As another example, the control engine 106 can acquire the current time using the timer 110. The timer 110 can enable the controller 104 to control the sensor device 102 even when the controller 104 has no communication with the network manager 180. As yet another example, the control engine 106 can direct a sensor 160 to measure one or more parameters and send the measurements to the control engine 106. The control engine 106 can also send results, raw measurements taken by a sensor 160, alarms, and/or other data associated with the sensor device 102 or portions thereof.

As a specific example, the control engine 160 can use one or more algorithms 133 to instruct a sensor 160 to measure a parameter, for the sensor 160 to send the measurement to the control engine 106, for the control engine 106 (using one or more algorithms 133) to analyze the measurement, (stored as stored data 134), and for the control engine 106 to take an action (e.g., send an alarm to a user system 155) based on the result (stored as stored data 134) of the analysis.

The control engine 106 can also send and/or receive communications. As a specific example, the control engine 106 can use one or more algorithms 133 to receive (using a protocol 132 for communication) a signal (e.g., received using the optional antenna assembly 139), for the control engine 106 to analyze the signal, and for the control engine 106 to take an action (e.g., instruct a sensor 160 to measure one or more parameters) based on the contents of the signal. As another specific example, the control engine 106 can use one or more algorithms 133 to determine that a communication to a component (e.g., the network manager 180) external to the sensor device 102 needs to be sent, and to send a communication signal (using a protocol 132 for communication that is saved as stored data 134) using the communication module 108, the transceiver 124, and, in some cases, the optional antenna assembly 139.

The control engine 106 can provide control, communication, and/or other similar signals to the users 150 (including associated user systems 155), the network manager 180, the power source 195, and one or more of the sensors 160. Similarly, the control engine 106 can receive control, communication, and/or other similar signals from the user 150 (including associated user systems 155), the network manager 180, the power source 195, and one or more of the sensors 160. The control engine 106 can control each sensor 160 automatically (for example, based on one or more protocols 132 stored in the control engine 106) and/or based on control, communication, and/or other similar signals received from another component (a user system 155 of a user 150) of the system 100 through a communication link 105. The control engine 106 may include a printed circuit board, upon which the hardware processor 120 and/or one or more discrete components of the controller 104 are positioned.

In certain embodiments, the control engine 106 of the controller 104 can communicate with one or more components of a system external to the system 100. For example, the control engine 106 can interact with an inventory management system by ordering a sensor 160 or an energy storage device 179 to replace a sensor 160 or an energy storage device 179 that the control engine 106 has determined to fail or to be failing. As another example, the control engine 106 can interact with a workforce scheduling system by scheduling a maintenance crew to repair or replace the a component (a wire 148) of the sensor device 102 when the control engine 106 determines that the component of the sensor device 102 requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., the energy storage device 179, a sensor 160) of the sensor device 102. For example, if a sensor 160 of the sensor device 102 operates under IEC Standard 62386, then the sensor 160 can have a serial communication interface that will transfer data (e.g., stored data 134) measured by the sensor 160. In such a case, the control engine 106 can also include a serial interface to enable communication with the sensor 160 within the sensor device 102. Such an interface can operate in conjunction with, or independently of, the protocols 132 used to communicate between the controller 104 and the users 150 (including associated user systems 155), the network manager 180, and the power source 195.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 108 of the controller 104 determines and implements the communication protocol (e.g., from the protocols 132 of the storage repository 130) that is used when the control engine 106 communicates with (e.g., sends signals to, receives signals from) a user 150 (including an associated user system 155), the network manager 180, the power source 195, and/or one or more of the sensors 160. In some cases, the communication module 108 accesses the stored data 134 to determine which communication protocol 132 is used to communicate with the sensor 160 associated with the stored data 134. In addition, the communication module 108 can interpret the communication protocol 132 of a communication received by the controller 104 so that the control engine 106 can interpret the communication.

The communication module 108 can send and receive data between the network manager 180, the power source 195, the sensors 160, and/or the users 150 (including associated user system 155) and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer with one or more sensors 160, the power source 195, the network manager 180, and/or a user 150 (including an associated user system 155) by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from a user 150 (including an associated user system 155), based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

In certain example embodiments, the power module 112 of the controller 104 receives power from the energy storage device 179 and manipulates (e.g., transforms, rectifies, inverts) that power to provide the manipulated power to one or more other components (e.g., timer 110, control engine 106) of the controller 104. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112.

The power module 112 can include one or more components (e.g., a transformer, a diode bridge, an inverter, a converter) that receives power (for example, through an electrical cable) from the energy storage device 179 of the sensor device 102 and generates power of a type (e.g., alternating current, direct current) and level (e.g., 12V, 24V, 120V) that can be used by the other components of the controller 104. The power module 112 can use a closed control loop to maintain a preconfigured voltage or current with a tight tolerance at the output. The power module 112 can also protect the rest of the electronics (e.g., hardware processor 120, transceiver 124) of the sensor device 102 from surges generated in the line.

In addition, or in the alternative, the power module 112 can be a source of power in itself to provide signals to the other components of the controller 104. For example, the power module 112 include be a battery. As another example, the power module 112 can include a localized photovoltaic power system. In certain example embodiments, the power module 112 of the controller 104 can also provide power and/or control signals, directly or indirectly, to one or more of the sensors 160. In such a case, the control engine 106 can direct the power generated by the power module 112 to the sensors 160 of the sensor device 102. In this way, power can be conserved by sending power to the sensors 160 of the sensor device 102 when those sensors 160 need power, as determined by the control engine 106.

The hardware processor 120 of the controller 104 executes software, algorithms 133, and firmware in accordance with one or more example embodiments. Specifically, the hardware processor 120 can execute software on the control engine 106 or any other portion of the controller 104, as well as software used by a user system 155 of a user 150, the network manager 180, the power source 195, and/or one or more of the sensors 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the users 150 (including associated user systems 155), the network manager 180, the power source 195, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of a user system 155 of a user 150, the network manager 180, the power source 195, and/or a sensor 160. The transceiver 124 can use any of a number of signal types, including but not limited to radio signals. In some cases, the transceiver 124 can be part of, or at least in communication with, the optional antenna assembly 139.

When the transceiver 124 uses wireless technology, any type of wireless technology can be used by the transceiver 124 in sending and receiving signals. Such wireless technology can include, but is not limited to, Wi-Fi, Zigbee, visible light communication, cellular networking, BLE, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for the user systems 155 of the users 150, the network manager 180, the power source 195, and/or the sensors 160 can be part of the stored data 134 (or similar areas) of the storage repository 130.

Optionally, in one or more example embodiments, the security module 128 secures interactions between the controller 104, the user systems 155 of the users 150, the network manager 180, the power source 195, and/or the sensors 160. More specifically, the security module 128 authenticates communication from software based on security keys verifying the identity of the source of the communication. For example, user software may be associated with a security key enabling the software of a user system 155 of a user 150 to interact with the controller 104. Further, the security module 128 can restrict receipt of information, requests for information, and/or access to information in some example embodiments.

Figure 2:
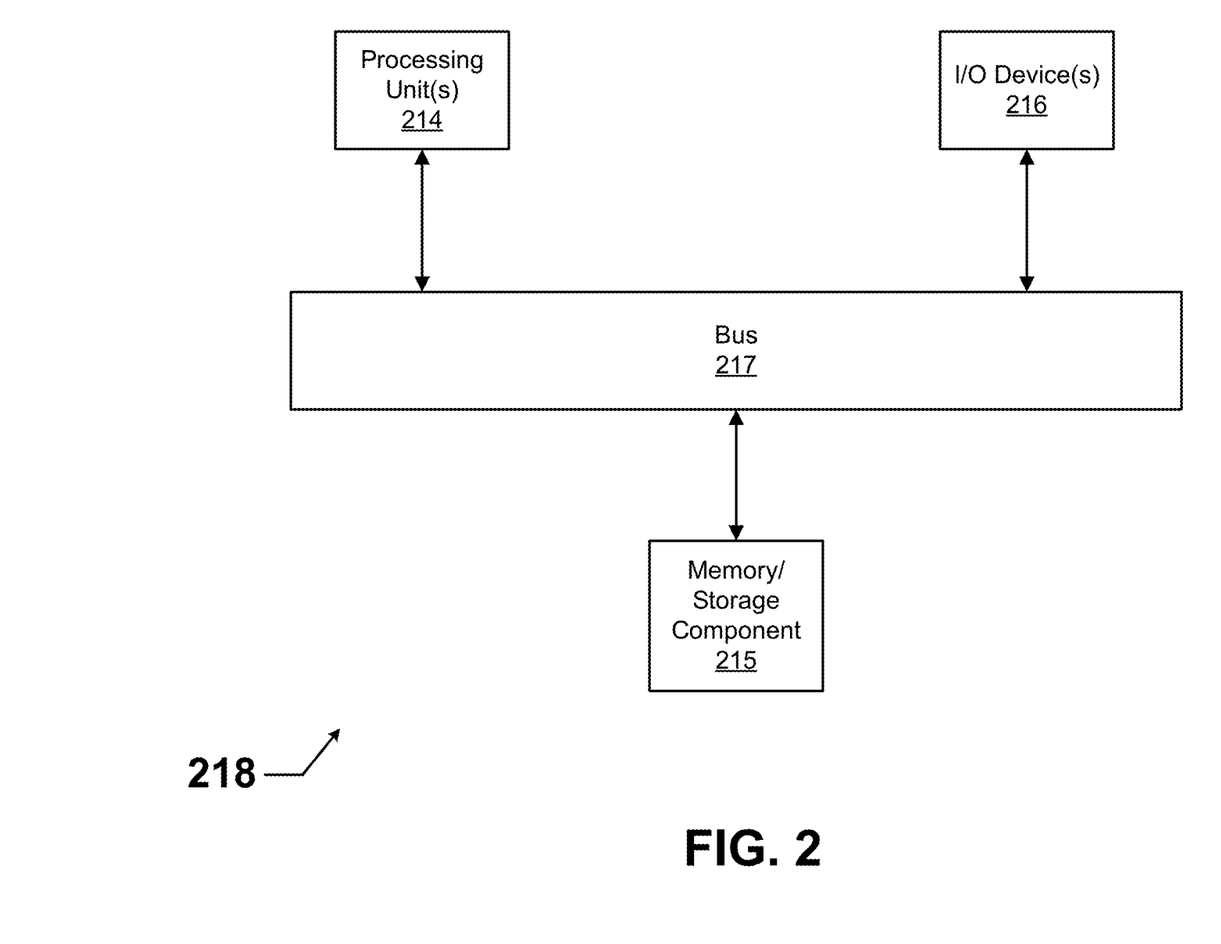
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

FIG. 3 shows a diagram of another system 300 that includes a sensor device 302 in accordance with certain example embodiments. Referring to FIGS. 1 through 3, the configuration and components of the system 300 of FIG. 3 are substantially the same as the configuration and corresponding components of the system 100 of FIG. 1, except as described below. For example, the system 300 of FIG. 3 includes one or more users 350 (which can include one or more user systems 355), a power source 395, a network manager 380, one or more external devices 340, and a sensor device 302 (which includes a control engine 306, a communication module 308, a timer 310, a power module 312, a storage repository 330, a hardware processor 320, a memory 322, a transceiver 324, an application interface 326, and, optionally, a security module 328), all of which can be substantially the same as the one or more users 350 (which can include one or more user systems 355), the power source 395, a network manager 380, the one or more external devices 340, and the sensor device 302 (which includes the control engine 106, the communication module 108, the timer 110, the power module 112, the storage repository 130, the hardware processor 120, the memory 122, the transceiver 124, the application interface 126, and, optionally, the security module 128) of the system 100 of FIG. 1.

The system 300 of FIG. 3 also includes multiple wires 348 (wire 348-1, wire 348-2) and one or more magnetic components 344. The wire 348-1 of FIG. 3 can be substantially the same as the wire 148 of FIG. 1. Further, while wire 348-2 of FIG. 3 can have the same characteristics as the wire 148 of FIG. 1, wire 348-2 moves based on and during the operation of the external device 340 in this example in much the same way that the moving magnet components 144 of FIG. 1 move based on and during the operation of the external device 140. In other words, wire 348-2 is part of or coupled to the external device 340, and so the movement of the external device 340 during its operation causes wire 348-2 to be in motion.

Also, the one or more magnetic components 344 of the system 300 of FIG. 3 are stationary, regardless of whether the external device 340 is operating. In this way, based on Faraday's Law of Electromagnetic Induction, even though the magnetic field produced by the stationary magnetic components 344 does not move, the motion of the wire 348-2 while the external device 340 is operating and the proximity of the wire 348-2 to the magnetic field produced by the stationary magnetic components 344 induces current to flow through the wire 348-2. When wire 348-2 and wire 348-1 are electrically coupled to each other, the current induced in wire 348-2 flows through wire 348-1 to the energy storage devices 379. In some cases, wire 348-1 and wire 348-2 can be different portions of the same continuous wire 348.

FIG. 4 shows an example of how Faraday's Law of Electromagnetic Induction works. Referring to FIGS. 1 through 4, the example of FIG. 4 shows a moving magnetic component 444 (similar to the moving magnetic component 144 of FIG. 1) that moves in a horizontal direction. To the left of the moving magnetic component 444 is a coil of wire 448 that receives at least part of the moving magnetic component 444 as the moving magnetic component 444 moves to the left. FIG. 4 also shows a sensor 460 in the form of a Galvanometer to measure the current induced in the coil due to changes in the magnetic field, which result from movement of the moving magnetic component 444 relative to the wire 448.

Figure 5:
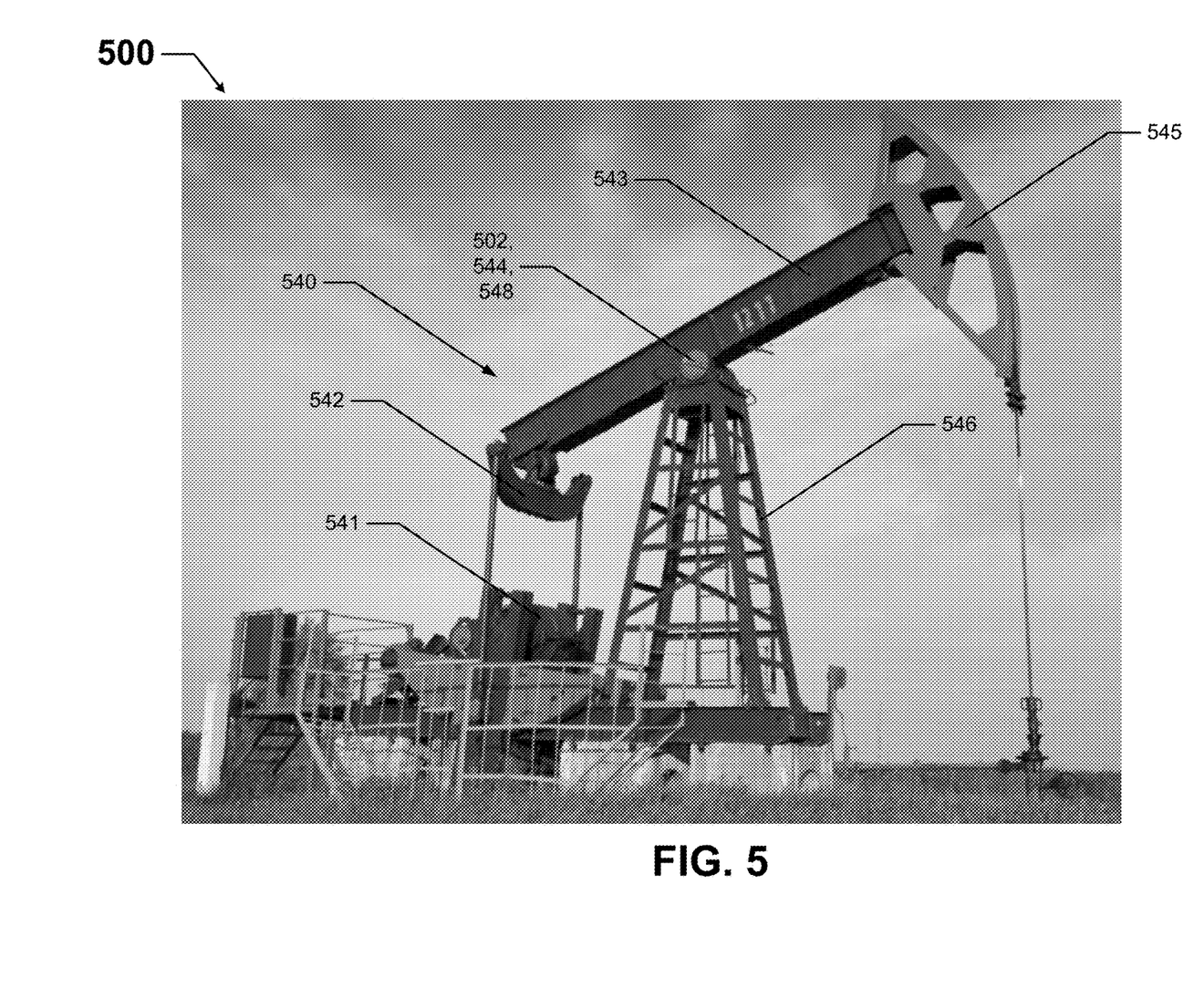
FIG. 5 shows an example of a system that includes an external device and a sensor module in accordance with certain example embodiments.

FIG. 5 shows an example of a system 500 that includes a sensor device 502 and an external device 540 in accordance with certain example embodiments. Referring to FIGS. 1 through 5, the external device 540 in this case is a pump jack commonly used in oilfield operations in the United States. The center bearing (also called a pivot axis) is where the sensor device 502, the wire 548, and the moving magnetic component 544 are positioned. As the crank 541 of the pump jack 540 operates, the equalizer bearing 542 lifts the walking beam 543 up and down, thereby moving the horsehead 545 up and down. The walking beam 543 is balanced atop the samson post 546, and so the walking beam 543 rotates within a limited range of motion relative to the samson post 546.

As the walking beam 543, which can be magnetic or have one or more magnets affixed thereto, rotates within a limited range of motion relative to the samson post 546, the approximate axis point or any other point on the walking beam 543 can serve as the moving magnetic component 544. With the wire 548 located proximate to the moving magnetic component 544, current can be induced in the wire 548 and flow to the energy storage device (e.g., energy storage device) of the sensor device 502. This power stored in the energy storage device can be used to operate one or more sensors (e.g., sensor 160), the controller (e.g., controller 104) of the sensor device 502, some other component of the sensor device 502, and/or some other component of another device (e.g., another sensor device) in the system 500.

In one or more example embodiments, example embodiments can be used to induce power based on the motion of a magnetized portion of a piece of equipment that is inherent during its operation. Using the principals of Faraday's Law of Electromagnetic Induction, relative motion between a magnet and a wire that are associated with an external device and a sensor device, sometimes but not always respectively, induces current in the wire. This induced current can be delivered by the wire to one or more energy storage devices (e.g., batteries), and the power stored in these energy storage devices can be used to power a device such as one or more sensors of one or more sensor devices. The sensor device can then send measurements of one or more parameters, taken by the sensor, for use in modeling and forecasting some or all of an operation of a system.

The application of this invention can be useful in cases where equipment that is in motion during operation, and especially in cases where the equipment is remotely located from a power source that can be used for lower-voltage applications, such as for a sensor device. For example, oilfield operations can utilize example embodiments described herein. Example embodiments can be used for a long-term power solution relative to stand-alone non-rechargeable batteries or hybrid solutions involving photovoltaic power. Example embodiments can provide reliable, real-time capability of a sensor module within a volume of space and within any type of environment. Using example embodiments described herein can improve communication, safety, maintenance, costs, and operating efficiency.

Accordingly, many modifications and other embodiments set forth herein will come to mind to one skilled in the art to which sensor devices powered by inherent motion of external devices pertain having the benefit of the teachings presented in the foregoing descriptions and the associated drawings. Therefore, it is to be understood that sensor devices powered by inherent motion of external devices are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system comprising:
   a pump jack comprising a walking beam that rotates while operating, wherein the walking beam comprises a movable portion of a wire that moves while the walking beam is operating; and
   a sensor device comprising:
   an energy storage device that provides power when charged;
   a first sensor coupled to the energy storage device, wherein the first sensor measures at least one first parameter when receiving the power from the energy storage device; and
   a stationary portion of the wire, wherein the stationary portion of the wire is coupled to the energy storage device, wherein the movable portion of the wire is disposed proximate to at least one magnet that remains stationary while the walking beam is operating, wherein a relative motion between the movable portion of the wire and the at least one magnet induces current in the movable portion of the wire, wherein the induced current in the movable portion of the wire flows to the energy storage device through the stationary portion of the wire to charge the energy storage device.

2. The system of claim 1, wherein the sensor device further comprises a timer used to determine a number of rotations of the walking beam in a unit of time.

3. The system of claim 1, wherein the at least one first parameter is associated with operation of the pump jack.

4. The system of claim 1, further comprising:
a controller coupled to the first sensor, wherein the system processes measurements made by the first sensor.

5. The system of claim 1, further comprising:
a transceiver coupled to the first sensor, wherein the transceiver sends a plurality of signals comprising measurements made by the first sensor of the at least one first parameter.

6. The system of claim 5, further comprising:
an antenna assembly coupled to the transceiver, wherein the antenna assembly facilitates sending the plurality of signals.

7. The system of claim 1, further comprising:
a second sensor coupled to the energy storage device, wherein the second sensor measures at least one second parameter when receiving the power from the energy storage device.

8. A system comprising:
a pump jack comprising a movable portion while operating, wherein a movable portion of a wire is part of the movable portion of the pump jack; and
a sensor device comprising:
  an energy storage device that provides power when charged;
  a sensor coupled to the energy storage device, wherein the sensor measures at least one first parameter when receiving the power from the energy storage device; and
  a stationary portion of the wire, wherein the stationary portion of the wire is coupled to the energy storage device, wherein the movable portion of the wire is disposed proximate to at least one magnet that remains stationary while the pump jack is operating, wherein a relative motion between the movable portion of the wire and the at least one magnet induces current in the movable portion of the wire, wherein the induced current in the movable portion of the wire flows to the energy storage device through the stationary portion of the wire to charge the energy storage device.

9. The system of claim 8, wherein the movable portion of the wire is affixed to the movable portion of the pump jack.

10. The system of claim 8, wherein the movable portion of the pump jack has a motion, wherein the at least one magnet is proximate to the movable portion throughout the motion.

11. The system of claim 8, wherein the movable portion of the pump jack has a motion, wherein the at least one magnet is proximate to the movable portion.

12. The system of claim 8, wherein the sensor is remotely located from the energy storage device.

13. The system of claim 8, wherein the sensor device further comprises:
a transceiver that broadcasts a plurality of signals comprising measurements made by the sensor.

14. The system of claim 13, further comprising:
a network manager communicably coupled to the sensor device, wherein the network manager receives the plurality of signals and uses the measurements to evaluate operation of the pump jack.

15. The system of claim 13, further comprising:
a network manager communicably coupled to the sensor device, wherein the network manager receives the plurality of signals and uses the measurements to evaluate additional equipment.

16. The system of claim 8, wherein the sensor device further comprises a housing.

* * * * *